No. 843,975. PATENTED FEB. 12, 1907.
A. THOMA.
MACHINE FOR MAKING INNERSOLES.
APPLICATION FILED MAY 17, 1905.
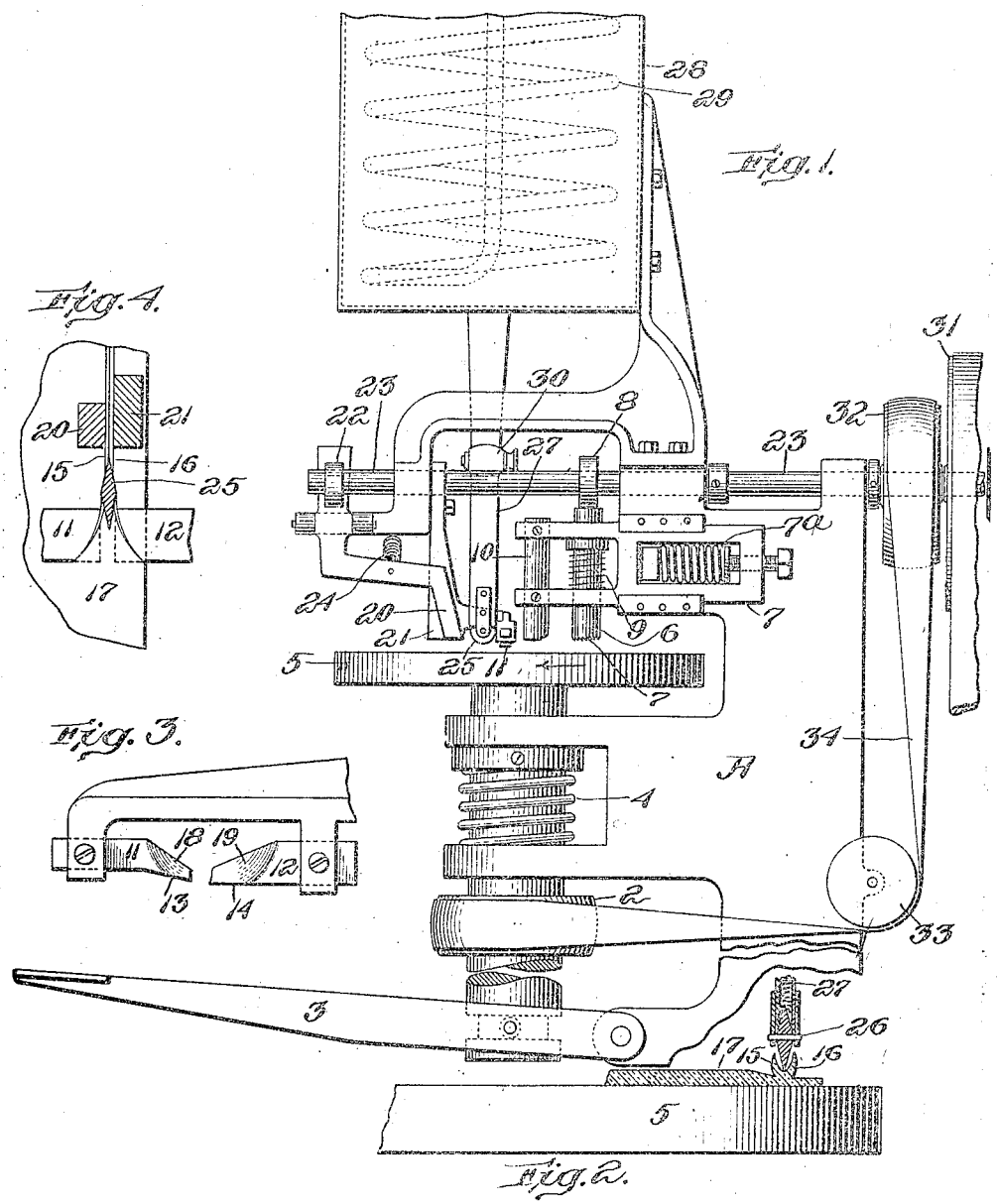
Witnesses:
Edward Maxwell.
M. J. Spalding.
Inventor:
Andrew Thoma,
by Geo. S. Maxwell,
Attorney ered by a foot-lever 3 against the action of a
UNITED STATES PATENT OFFICE.

ANDREW THOMA, OF CAMBRIDGE, MASSACHUSETTS.

MACHINE FOR MAKING INNERSOLES.

No. 843,875.   Specification of Letters Patent.   Patented Feb. 12, 1907.

Application filed May 17, 1905. Serial No. 260,761.

*To all whom it may concern:*

Be it known that I, ANDREW THOMA, a citizen of the United States, residing at Cambridge, in the county of Suffolk and State of Massachusetts, have invented an Improvement in Machines for Making Innersoles, of which the following description, in connection with the accompanying drawings, is a specification, like numerals on the drawings representing like parts.

My invention applies to that kind of innersole in which a stitch-receiving lip is formed by cutting in horizontally along the periphery of the innersole-body, so as to form a thin lip above the feather-edge, and by forming a similar coöperating lip by cutting obliquely downwardly and outwardly along the inside of the first-mentioned lip, said two lips being then turned up vertically and secured together to form an upstanding stitch-receiving lip or ridge.

In making innersoles the leather is first moistened to make it less refractory, so that the lip can be turned up, and in making the above kind of innersole the entire top surface is smeared with rubber cement, which is allowed to stand until the cement has dried, (as it will not hold while any naphtha remains.) Then after the two lips have been turned up and hammered together (this being the manner of securing the cemented lips) the whole surface is again cemented in order to coat the recently-cut leather surface. Not only is an undue amount of cement used and much time consumed, but as the cement dries the moisture escapes from the leather also, which stiffens and will therefore not stay turned up. Accordingly I have devised the hereinafter-described mechanism for obviating the foregoing disadvantages, my mechanism producing a clean neat job without waste of cement and permitting the lip to be turned up at once and secured while freshly moistened and pliable. My invention makes this kind of innersole as practical and advantageous as the so-called "Gem" innersole.

In the accompanying drawings, in which I have illustrated sufficient details of a machine to make my invention understood, Figure 1 is a fragmentary view in side elevation, showing the essential features of the apparatus. Fig. 2 is an enlarged detail showing the work in operative position on the worktable. Fig. 3 is a front elevation of the formers or shaping-knives. Fig. 4 is a horizontal sectional view showing the relation of the knives, cement-delivery apparatus, and adjacent parts to the innersole, a fragmentary view of the latter being indicated.

On a suitable rotary standard 1, herein shown as continuously rotated by a driving-wheel 2 and adapted to be raised and lowered by a foot-lever 3 against the action of a spring 4, is a table 5, normally rotating in the direction of the arrow for supporting the innersole to be treated. Above this worktable is a feeder or plunger 6, whose carrying-frame 7 slides longitudinally in the main frame A of the machine, being normally retracted by a spring 7ª, said feeder having a serrated lower end to engage the work and rapidly reciprocated by any suitable means, as a cam 8, operating in opposition to a spring 9. Adjacent this feeder is a vertically-stationary rest 10 for holding the work down upon the table as it is fed to opposite formers 11 12, herein shown as knives, whose forward edges 13 14 separate the lips 15 16 from the innersole-body 17, said lips being turned upwardly toward each other by properly-curved shaping portions 18 19 at the rear of the front edges 13 14 of said formers or shapers. When the lips have been brought substantially together, they are rapidly pounded by a vibrating hammer or beater 20, which operates against the lip 15, while the opposite side of the lip 16 is engaged by a stationary anvil or beater 21. The vibrator 20 is operated by any suitable means, as by a cam 22 on the shaft 23, against the action of a spring 24. I have not attempted to show the foregoing mechanism in elaborate detail, but have merely indicated sufficient portions thereof to represent the general operation and construction, my invention being intended to operate with a machine of this general character, (for instance, such as shown in Patent No. 656,842, of August 28, 1900.)

As before stated, my invention resides in providing means for making it possible to do away with the cost and delay of the cementing operations, as above explained, and I accomplish this by interposing between the formers 11 12 and beaters 20 21 means for locally coating the inner surfaces of the lips with a quick-drying hot cement capable of adhering tenaciously to leather without first being required to dry and set. This may be accomplished by various devices and means; but I prefer to employ a small wedge-shaped roller or disk 25, journaled at 26 in the lower end of a cement-delivery spout 27, leading from a cement-tank 28, heated by any suitable means, as by steam-pipes 29. The flow of cement may be further regulated by a valve 30. The formers 11 12 are spaced apart so that they do not quite close the channel of the lip formed by the two lips 15 16, and as the sole is fed along by the table 5 the roller 25 deposits in said channel just the right amount of hot cement for properly coating the contiguous walls of the lips, which are thereupon immediately closed and pounded together by the beating action of the coöperating parts 20 21. Suitable pulleys 31 32 33 and a belt 34 serve to drive the machine.

My invention makes it possible to unite the channel-lips while damp or wet, and hence more easily shaped and more readily united. It also enables the innersole to be made with extreme neatness, avoiding the profuse smearing of the innersole with the disagreeable and expensive rubber cement heretofore used. It also permits the innersole to be completed at once. I employ a cement composed mainly of gutta-percha and gum chickle or pontianac, (or any resinous gum tempered to chill quickly,) which will chill and set almost instantly upon coming in contact with the cold wet surface of the lip-channel. My mechanism delivers only the small quantity of coating necessary for forming an adhesive medium between the contiguous walls of the leather lips, and just before the cement has had a chance to set said walls are forcibly hammered together.

In use the treadle 3 is lowered sufficiently to enter the innersole beneath the feeder 6. The foot is then released from the treadle, permitting the constantly-rotating table 5 to engage the under side of the innersole, whereupon the rapidly-reciprocating action of the serrated feeder 6 intermittingly presses the innersole hard upon said moving table and releases said pressure, the result being a constant forward feeding of the innersole, which is held in place by the rest 10, whereupon the lips 15 16 are formed and lifted upward by the former or shaper knives 11 12 and are thereupon immediately coated by the small amount of hot cement delivered thereto by the small disk 25, which rolls along the bottom of the channel formed by said upturned lips. As the cement is smeared upon the walls of the channel it begins immediately to chill and set; but said walls are instantly brought together behind the wheel and forcibly stuck against each other by the beaters 20 21, thereby entirely completing the stitch-receiving lip, so that the innersole travels forward in its finished and permanent shape ready to receive a reinforcing-covering, if desired, or to be used directly in shoe manufacture.

I prefer to employ a roller 25 for delivering the quick-chilling hot cement, as its engagement with the bottom of the lip-channel causes it to deliver the cement toward the wider portion of said channel and the wedge-shaped sides of said disk aid in properly distributing the cement uniformly over the contiguous walls of said channel; but I wish it understood that I am not limited to this construction, as my invention includes, broadly, any means for simultaneously turning up the lips and depositing cementitious material therebetween just as the lips are being brought finally together.

Having described my invention, what I claim as new, and desire to secure by Letters Patent, is—

1. In an innersole-forming machine, the combination with means for upturning the contiguous lips, feeding mechanism, and automatic means for cementing said upturned lips together as they are being fed.

2. In an innersole-forming machine, the combination with means for upturning the opposite lips, and means for pressing said lips together, of mechanism for applying cement in the lip-channel between said two means.

3. In an innersole-forming machine, feeding mechanism, means for pressing together the upturned lips of the innersole, and mechanism for applying cement in the lip-channel as the feeding mechanism delivers the same to be pressed.

4. In an innersole-forming machine, feeding mechanism, means for pressing together the upturned lips of the innersole, cement-heating means, and mechanism for applying the hot cement in the lip-channel as the feeding mechanism delivers the same to be pressed.

5. In an innersole-forming machine, feeding mechanism, means for pressing together the upturned lips of the innersole, and mechanism for applying cement in the lip-channel as the feeding mechanism delivers the same to be pressed, said applying mechanism including means for spreading the cement on the contiguous walls of the lips.

6. In an innersole-forming machine, feeding mechanism, means for pressing together the upturned lips of the innersole, and mechanism for applying cement in the lip-channel as the feeding mechanism delivers the same to be pressed, including wedging means for holding said lips apart for receiving said cement.

7. In an innersole-forming machine, feeding mechanism, means for pressing together the upturned lips of the innersole, and mechanism for applying cement in the lip-channel as the feeding mechanism delivers the same to be pressed, including means for maintaining the channel open and delivering the cement at the rear thereof.

8. In an innersole-forming machine, feeding mechanism, means for pressing together the upturned lips of the innersole, and mechanism for applying cement in the lip-channel as the feeding mechanism delivers the same to be pressed, including a small cement-delivering roller traveling in said channel.

9. The combination with an innersole-lip-channel-forming mechanism, of means for applying cement to the channel-surface only.

10. The combination with pressing means for joining together two narrow leather surfaces, of automatic mechanism for applying cement to said two surfaces to be joined, including means for restricting the cement to said two narrow surfaces.

11. The combination with pressing means for joining together two narrow leather surfaces, of automatic mechanism for applying cement to said two surfaces to be joined, including means for heating said cement before application.

In testimony whereof I have signed my name to this specification in the presence of two subscribing witnesses.

ANDREW THOMAS

Witnesses:
  GEO. H. MAXWELL
  M. A. JONES